(12) United States Patent
O'Neill (10) Patent No.: US 7,564,893 B2
(45) Date of Patent: Jul. 21, 2009

(54) TEST SYSTEM AND METHOD FOR PARALLEL MODULATION ERROR MEASUREMENT OF TRANSCEIVERS

(75) Inventor: Peter Mark O'Neill, Fort Collins, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 855 days.

(21) Appl. No.: 11/086,523

(22) Filed: Mar. 22, 2005

(65) Prior Publication Data

US 2006/0215744 A1 Sep. 28, 2006

(51) Int. Cl.
*H04B 1/38* (2006.01)
*H04B 17/00* (2006.01)

(52) U.S. Cl. .................. 375/219; 375/221; 375/224

(58) Field of Classification Search ......... 375/219–221, 375/224–228, 213; 455/67.14, 115.1, 423, 455/67.11; 370/241–253, 347; 342/165; 324/308, 312–317, 335, 458, 500–537, 605–606, 324/612–618, 637
See application file for complete search history.

(56) References Cited

U.S. PATENT DOCUMENTS

| | | | |
|---|---|---|---|
| 5,371,481 A | 12/1994 | Tiittanen et al. | |
| 5,448,616 A | 9/1995 | Kaewell, Jr. et al. | |
| 5,604,728 A | 2/1997 | Jylha | |
| 5,724,388 A | 3/1998 | Nagano et al. | |
| 5,963,589 A * | 10/1999 | Nagano et al. | 375/224 |
| 6,070,086 A | 5/2000 | Dobrica | |
| 6,208,621 B1 * | 3/2001 | Ducaroir et al. | 370/241 |
| 6,477,198 B1 * | 11/2002 | Gumm | 375/228 |
| 6,570,933 B1 * | 5/2003 | Makinen | 375/296 |
| 6,795,693 B2 * | 9/2004 | Balech | 455/115.1 |
| 6,940,263 B2 * | 9/2005 | Henriksson | 324/76.19 |
| 7,181,205 B1 * | 2/2007 | Scott et al. | 455/423 |
| 7,236,778 B2 * | 6/2007 | Schreiber | 455/423 |
| 7,340,219 B2 * | 3/2008 | Heaton et al. | 455/67.11 |
| 7,366,233 B1 * | 4/2008 | Eckert | 375/224 |
| 7,453,931 B2 * | 11/2008 | Minihold et al. | 375/224 |
| 2004/0240537 A1 * | 12/2004 | Minihold et al. | 375/224 |

* cited by examiner

*Primary Examiner*—Tesfaldet Bocure
*Assistant Examiner*—Lawrence B Williams (57) ABSTRACT

A test system is capable of performing parallel modulation error measurement of transceivers using a loop-back configuration. Each transceiver includes a transmitter and a receiver. A signal generator generates a first modulated signal for input to the receivers of the transceivers. A tester is operable to measure a first demodulation error produced by the receiver in response to the first modulated signal and to measure a modulation error of the transmitter based on the first demodulation error and a second demodulation error. The second demodulation error is produced by the receiver in response to a second modulated signal generated by the transmitter and coupled from the transmitter to the receiver.

24 Claims, 9 Drawing Sheets

TEST SYSTEM AND METHOD FOR PARALLEL MODULATION ERROR MEASUREMENT OF TRANSCEIVERS

BACKGROUND OF THE INVENTION

Each wireless communication device, such as a cellular telephone, two-way radio, personal digital assistant (PDA), pager, personal computer (PC), laptop computer, home entertainment equipment, etc., either includes a built-in radio transceiver (i.e., receiver and transmitter) or is coupled to an associated radio transceiver (e.g., a station for in-home and/or in-building wireless communication networks, RF modem, etc.). Radio transceivers are currently being integrated, in System-on-Chip (SoC) or System-in-Package (SiP), to reduce cost, size, and power, and to increase functionality. One consequence of this integration is reduced test access to the radio system's functional blocks (e.g., individual transmitter and receiver blocks). Traditionally, radio transceiver testing has relied on separate testing of each transmitter and parallel testing of multiple receivers. Thus, receiver testing has generally enjoyed the benefits of reduced test time and reduced test cost. However, with the integration of transmitters and receivers onto a single chip, the ability to test multiple receivers in parallel does not result in a decrease in test time or test cost of integrated transceivers.

For example, modulation accuracy of a transmitter is typically measured by a precision receiver, while demodulation accuracy of a receiver typically uses a test signal generator (source). Both the precision receiver and the precision source are expensive test instruments. Although a single precision source can simultaneously stimulate multiple transceivers, a precision receiver is only capable of measuring the output of one transceiver at a time. Therefore, attempting to test multiple transceivers in parallel would not result in a corresponding decrease in test time or test cost, because one precision receiver test instrument is still required per transceiver device under test (DUT).

Therefore, what is needed is a test system that allows transceiver modulation error to be tested on multiple transceiver devices in parallel without increasing the number of test instruments in proportion to the number of transceivers being tested.

SUMMARY OF THE INVENTION

Embodiments of the present invention provide a test system for parallel modulation error measurement of transceivers using a loop-back test configuration. Each transceiver includes a transmitter and a receiver. A signal generator generates a first modulated signal for input to the receivers of the transceivers. A tester is operable to measure a first demodulation error produced by the receiver in response to the first modulated signal and to measure a modulation error of the transmitter based on the first demodulation error and a second demodulation error. The second demodulation error is produced by the receiver in response to a second modulated signal generated by the transmitter and coupled from the transmitter to the receiver.

In one embodiment, the transceiver includes an internal connection connecting the transmitter to the receiver. In another embodiment, the transmitter is connected to the receiver via an interface to the tester.

In a further embodiment, the first modulated signal includes a plurality of symbols, each defined by a respective in-phase (I) and quadrature-phase (Q) value. The receiver is operable to demodulate the first modulated signal to produce a first output demodulated signal approximating the symbols in the first modulated signal. The first demodulation error for one of the symbols is measured as a difference between the I and Q values in the first output demodulated signal for that symbol and the I and Q values in the first modulated signal for that symbol.

In still a further embodiment, the receiver is operable to demodulate the second modulated signal to produce a second output demodulated signal. The modulation error for a symbol is measured as a difference between the first demodulation error for the symbol and a difference of the I and Q values in the first modulated signal that define the symbol and the I and Q values in the second output demodulated signal for the symbol.

By utilizing a loop-back test configuration, the test system requires only a single precision source to measure both the demodulation and modulation errors of a radio transceiver, thus eliminating the need for precision receivers to measure transmitter modulation error. As a result, the test system is capable of testing transceiver modulation error on multiple devices in parallel without increasing the number of test instruments necessary for testing.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE EXEMPLARY EMBODIMENTS

Common transceiver tests include error-vector magnitude (EVM) for transmitter modulation and receiver demodulation accuracy, signal to noise and distortion (SINAD) for the receiver adding unwanted signals, and spectral mask for the transmitter adding unwanted signals. In general, EVM is a measure of signal quality, and provides a mechanism for uncovering at least some of the underlying causes of signal impairments and distortion.

Transceivers modulate signals onto a sinusoidal carrier by varying both its amplitude and phase using a process known as vector modulation. This modulation process typically includes multiple combinations of amplitude and phase, where each combination is referred to as a symbol. When displayed in polar coordinates of amplitude and phase or in rectangular coordinates of in-phase (I or cosine) component and quadrature (Q or sine) component these symbols form a regular arrangement referred to as a constellation. Each symbol has an ideal position in the constellation. Actual symbols deviate from their ideal locations by an error vector. The greater the error vector, the greater the probability of mistaking a symbol for another symbol.

Error vector analysis deals with patterns of the magnitude and angle of the error vectors of all the symbols in a modulation format's constellation. EVM lumps all the error vectors into a single number that is the magnitude of their vector sum.

Figure 1A:
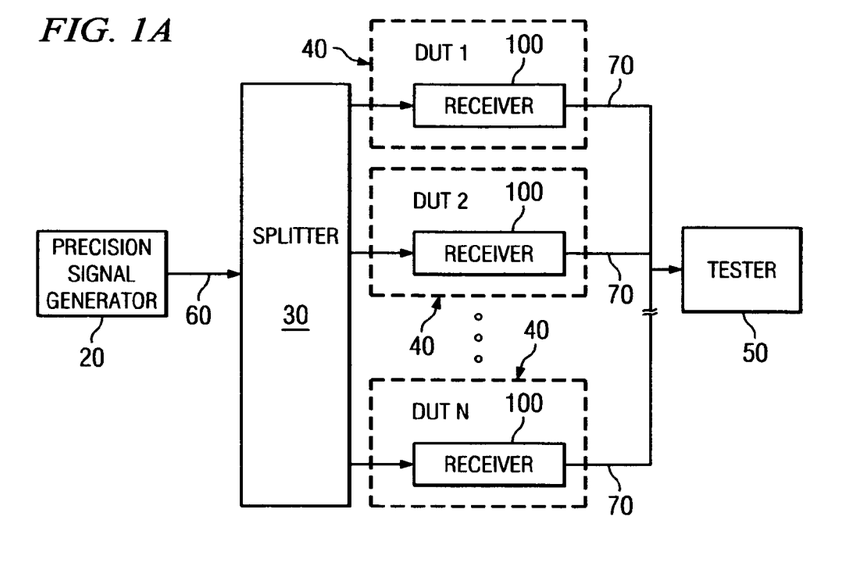
FIGS. 1A and 1B are block diagrams illustrating an exemplary test system for testing multiple transceivers in parallel, in accordance with embodiments of the present invention.

FIG. 1A is a block diagram illustrating an exemplary EVM test system 10 for testing the receivers 100 of multiple transceiver devices under test (DUT) 40 in parallel, in accordance with embodiments of the present invention. The test system 10 includes a precision signal generator 20, a signal splitter 30 and one or more testers 50. The precision signal generator 20 generates a modulated test signal 60 from a test symbol sequence. The precision signal generator 20 applies the modulated test signal 60 to the transceivers 40 in parallel via the splitter 30.

Each of the receivers 100 demodulates the modulated test signal to recapture inbound data in accordance with the particular wireless communication standard being implemented by the radio transceiver 40, and provides an output demodulated signal 70, including the recaptured inbound data (i.e., a receiver version of the test symbol sequence), to the tester 50. The tester 50 measures the demodulation error of each receiver 100 by comparing the receiver test symbol sequence in the output demodulated signal 70 to the original test symbol sequence represented by the modulated test signal 60 generated by the precision signal generator 20.

In one embodiment, the tester 50 is an external device connected to the output of one or more transceivers 40, and the tester 50 can be implemented using various automatic test equipment (ATE), as is known in the art. In another embodiment, at least a portion of the functionality of the tester 50 is included within the transceivers 40 to reduce the test equipment needed to test multiple transceivers in parallel.

Figure 1B:
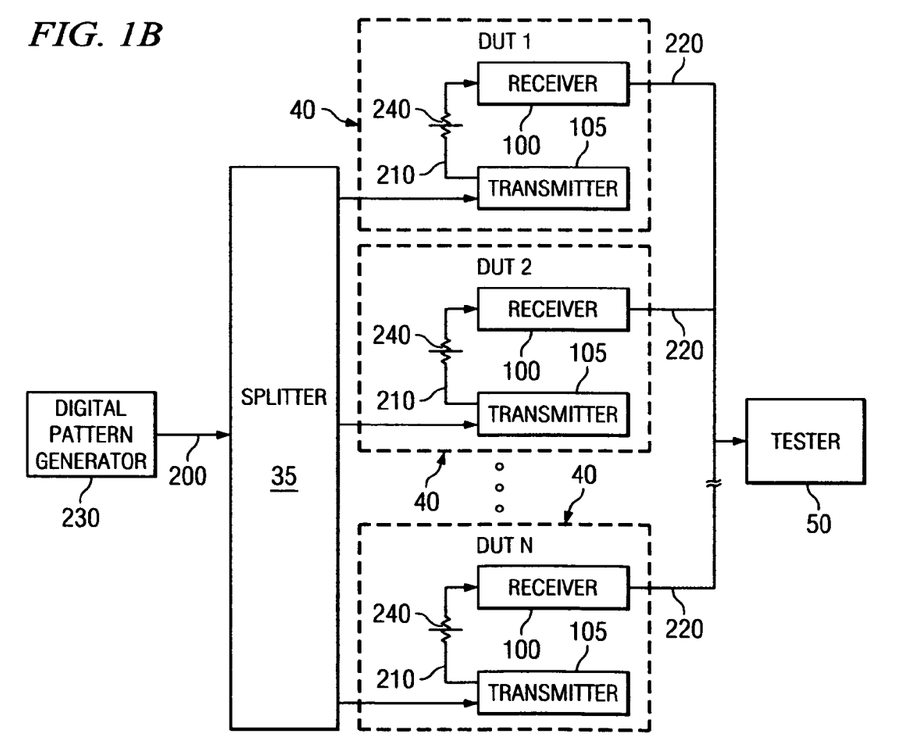

FIG. 1B is a block diagram illustrating an exemplary EVM test system for testing the transmitters 105 of multiple transceiver devices under test (DUT) 40 in parallel, in accordance with embodiments of the present invention. The test system 10 includes a digital pattern generator 230, a signal splitter 35 and one or more testers 50. The digital pattern generator 230 generates a test symbol sequence 200 that stimulates one or more of the transceivers 40 in parallel via a splitter 35. In other embodiments, the test symbol sequence 200 is generated internally by the individual transceivers 40.

In testing operation, each transceiver 40 receives the test symbol sequence 200 from the digital pattern generator 230 via the splitter 35. The digital pattern generator 230 feeds the test symbol sequence 200 to the transmitters 105 of each of the transceivers 40. The transmitters 105 each process the test symbol sequence 200 in accordance with a respective particular wireless communication standard to produce a respective outbound modulated transmitter signal. The outbound modulated transmitter signal of each transmitter is input to the respective receiver 100 of each transceiver 40 via a respective loop-back connection 240.

In one embodiment, the loop-back connection 240 is provided within the transceiver 40. In another embodiment, the loop-back connection 240 is provided externally by a DUT interface, e.g., the loadboard or probecard in package or wafer test, respectively, to the tester 50.

Each receiver 100 demodulates the respective outbound modulated transmitter signal in accordance with the particular wireless communication standard being implemented by the radio transceiver 40, and provides an additional respective output demodulated signal 220 that represents a recovered test symbol sequence to the tester 50. For each transceiver 40, the tester 50 measures the combined modulation error of the transmitter 105 and receiver 100 by comparing the recovered test symbol sequence in the additional output demodulated signal 220 to the original test symbol sequence 200 input to the transmitter 105 to determine the measured error. The known demodulation error of the receiver is subtracted from the measured error to obtain the transmitter modulation error.

Figure 2A:
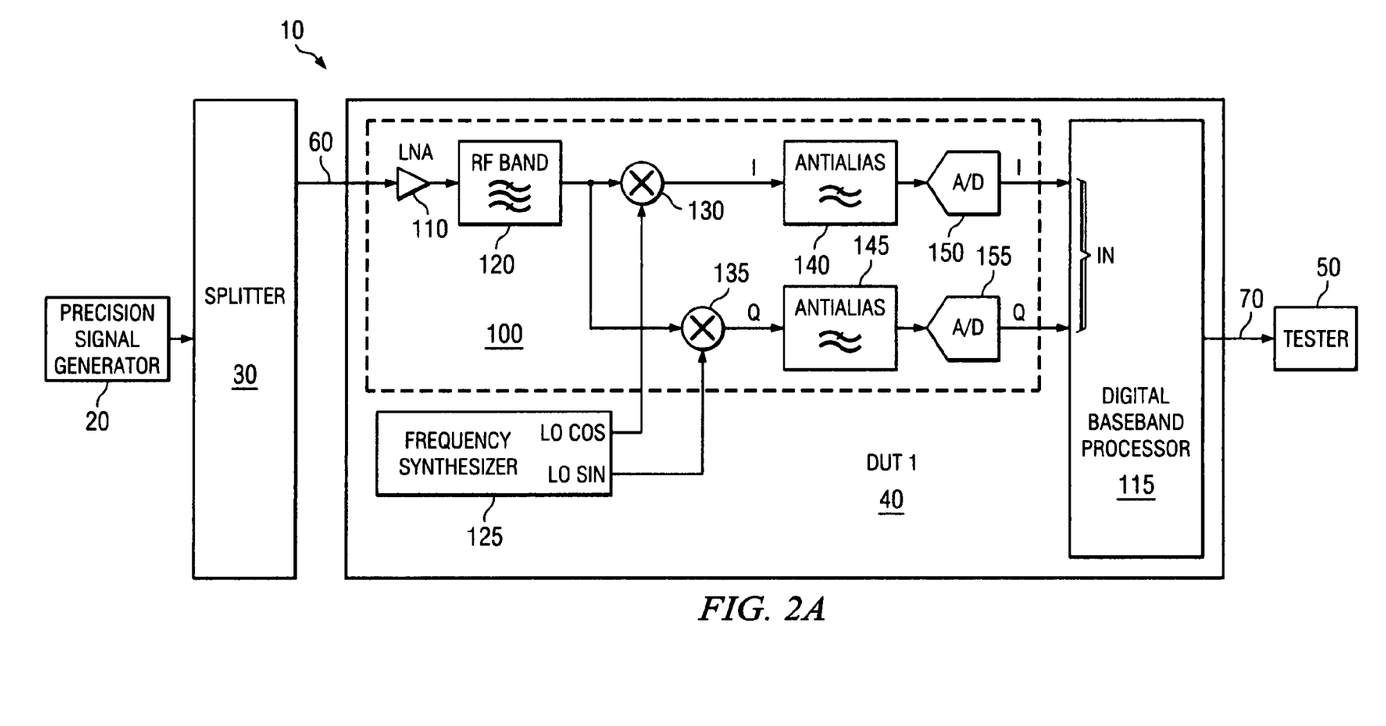
FIGS. 2A and 2B are more detailed block diagrams of the exemplary test system for testing multiple transceivers in parallel, in accordance with embodiments of the present invention.

FIG. 2A is a more detailed block diagram illustrating an exemplary EVM test system 10 for testing the receiver 100 of one of the multiple transceiver devices under test (DUT) 40, in accordance with embodiments of the present invention. As described above in connection with FIG. 1A, the test system 10 includes the precision signal generator 20, the splitter 30 and one or more testers 50. The precision signal generator 20 generates a modulated test signal 60 from a test symbol sequence. The precision signal generator 20 applies the modulated test signal 60 to the transceivers 40 (only one of which is shown for simplicity) in parallel via the splitter 30.

The transceiver DUT 40 includes a receiver 100, a frequency synthesizer 125 and a digital baseband processor 115. The digital baseband processor 115 performs various digital receiver functions, including, but not limited to, demodulation, constellation demapping, decoding, and/or descrambling.

Receiver 100 includes a low noise amplifier 110, a bandpass filter 120, mixers 130 and 135, anti-aliasing filters 140 and 145 and analog-to-digital converters 150 and 155. In testing operation, the receiver 100 receives the precision modulated inbound RF signal 60 from the precision signal generator 20 via the splitter 30, and provides the precision modulated inbound RF signal 60 to the low noise amplifier (LNA) 110. The LNA 110 amplifies the precision modulated inbound RF signal 60 to produce an amplified inbound RF signal. The LNA 110 provides the amplified inbound RF signal to the bandpass filter 120. The bandpass filter 120 isolates the frequency band of interest in the amplified inbound RF signal to produce a bandpass filtered inbound RF signal. The bandpass filtered inbound RF signal is provided to mixers 130 and 135. Mixers 130 and 135 down-convert the bandpass filtered inbound RF signal into inbound baseband in-phase (I) and quadrature-phase (Q) signals, respectively, using cosine and sine local oscillator signals provided by the frequency synthesizer 125.

The mixers 130 and 135 provide the I and Q inbound baseband signals to respective anti-aliasing filters 140 and 145 to filter and/or attenuate aliasing signals out of the I and Q inbound baseband signals to produce filtered inbound I and Q signals. The analog-to-digital converters 150 and 155 convert the filtered inbound I and Q signals, respectively, from the analog domain to the digital domain to produce a digital baseband signal. The receiver 100 architecture shown in FIG. 2A is merely illustrative of common receiver 100 architectures, and the present invention is not limited to any particular receiver 100 architecture.

The digital baseband processor 115 decodes, descrambles, demaps, and/or demodulates the digital baseband signal to recapture inbound data in accordance with the particular wireless communication standard being implemented by the radio transceiver 40, and provides an output demodulated signal 70, including the recaptured inbound data (i.e., receiver version of the test symbol sequence), to the tester 50. The tester 50 measures the demodulation error of the receiver 100 by comparing the receiver test symbol sequence in the output demodulated signal 70 to the original test symbol sequence represented by the modulated test signal 60 generated by the precision signal generator 20.

For example, in one embodiment, the tester 50 measures the demodulation error for each symbol as a difference between the I and Q values in the output demodulated signal 70 and the I and Q values that define the symbol in the modulated test signal 60. Since the symbols have precisely defined I and Q coordinates in the signal used to modulate the modulated test signal 60 produced by the precision signal generator 20, the demodulation error at each symbol can be fairly represented by the difference between the I and Q values in the output demodulated signal 70 output by the receiver 100 and the I and Q values that define the symbol in the modulated test signal 60. The demodulation errors for the symbols in the test symbol sequence are used to compute the error vector magnitude (EVM).

Figure 2B:
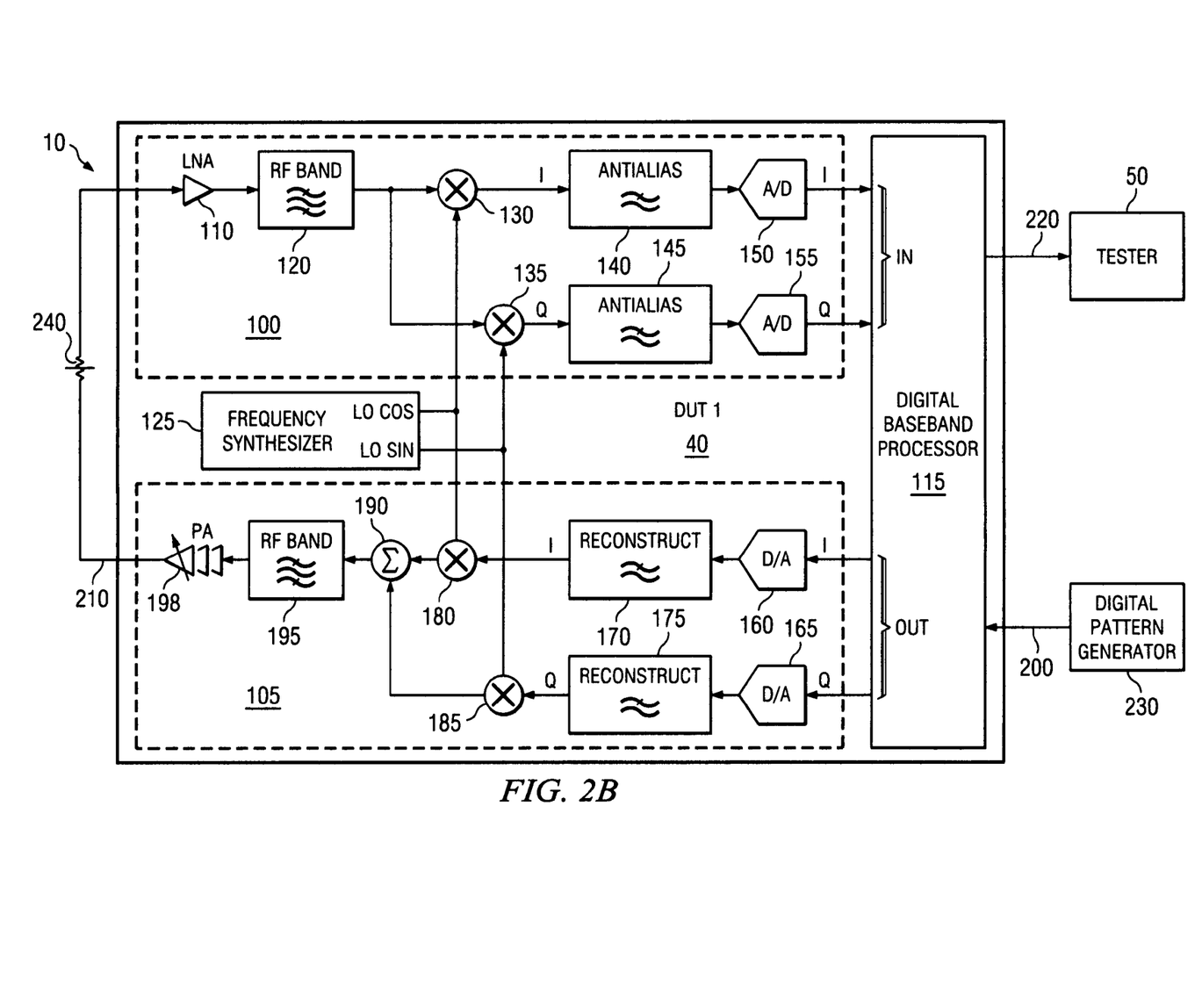

FIG. 2B is a more detailed block diagram illustrating an exemplary EVM test system 10 for testing the transmitter 105 of one of the multiple transceiver devices under test (DUT) 40, in accordance with embodiments of the present invention. As described above in connection with FIG. 1B, the test system 10 includes the digital pattern generator 230, the splitter 35 (shown in FIG. 1B) and one or more testers 50. The digital pattern generator 230 generates a test symbol sequence 200 that is applied to the transmitters 105 of one or more of the transceivers 40 (only one of which is shown for simplicity) in parallel via the splitter 35. In other embodiments, the test symbol sequence 200 is generated internally by the digital baseband processors 115 of the individual transceivers 40.

The transceiver DUT 40 includes the receiver 100, the frequency synthesizer 125, the digital baseband processor 115 and a transmitter 105. The digital baseband processor 115 performs the digital receiver functions described above in connection with FIG. 1 and also performs various digital transmitter functions, including, but not limited to, scrambling, encoding, constellation mapping and modulation.

Transmitter 105 includes digital-to-analog converters 160 and 165, reconstruction filters 170 and 175, mixers 180 and 185, a summing node 190, a bandpass filter 195 and a power amplifier 198. In testing operation, the transceiver 40 receives the test symbol sequence 200 from the digital pattern generator 230. The digital pattern generator 230 feeds the test symbol sequence 200 to the digital baseband processor 115. The digital baseband processor 115 processes the outbound data 200 in accordance with a particular wireless communication standard to produce digital transmission formatted I and Q data. The digital transmission formatted I and Q data is typically a digital baseband signal.

The digital-to-analog converters 160 and 165 convert the digital transmission formatted I and Q data, respectively, from the digital domain to the analog domain to produce baseband I and Q analog signals. The reconstruct filters 170 and 175 reconstruct (e.g., smooth) the baseband I and Q analog signals prior to providing them to the up-conversion mixers 180 and 185. The up-conversion mixers 180 and 185 directly convert the baseband I and Q analog signals, respectively, into I and Q RF signals using cosine and sine local oscillator signals provided by the frequency synthesizer 125.

The outputs of mixers 180 and 185 are fed to a summation node 190 that produces an outbound modulated RF signal. The outbound modulated RF signal is input to the bandpass filter 195 to isolate the frequency range interest in the outbound RF modulated signal to produce a filtered outbound RF signal. The power amplifier 198 amplifies the filtered outbound RF signal to produce an outbound modulated transmitter signal 210. The outbound modulated transmitter signal 210 is input to the receiver 100 of the transceiver 40 via a loop-back connection 240. In exemplary embodiments, the loop-back connection includes a variable attenuator.

In one embodiment, the loop-back connection 240 is provided internally within the transceiver 40 from the power amplifier 198 to the LNA 110. In another embodiment, the loop-back connection 240 is provided externally by a DUT interface, e.g., the loadboard or probecard in package or wafer test, respectively, to the tester 50.

The transmitter 105 architecture shown in FIG. 2B is merely illustrative of common transmitter 105 architectures, and the present invention is not limited to any particular transmitter 105 architecture. In addition, one or more of the power amplifier 198, LNA 110 and RF bandpass filters 195 and 120 can be located external to the transceiver chip. As a result, the loop-back connection 240 is not limited to a connection between any two particular components in the transmitter 105 and the receiver 100. For example, the loop-back connection 240 can be made between the RF bandpass filters 195 and 120 or from the summation node 190 to the mixers 130 and 135.

The receiver 100 produces a digital baseband signal from the outbound modulated transmitter signal 210 and provides the digital baseband signal to the digital baseband processor 115 for decoding, descrambling, demapping, and/or demodulating the digital baseband signal to produce an output demodulated signal 220 that represents a recovered test symbol sequence. The output demodulated signal 220 is input to the tester 50, which measures the combined modulation error of the transmitter 105 and the receiver 100 by comparing the recovered test symbol sequence in the output demodulated signal 220 to the original test symbol sequence 200 input to the transmitter 105. The known demodulation error of the receiver is subtracted from the combined modulation error to obtain the transmitter modulation error.

For example, in one embodiment, the tester 50 measures the combined modulation error of the transmitter 105 and the receiver 100 by subtracting the symbol's defining I and Q coordinates from the actual (recovered) values output by the receiver 100. The combined modulation error includes the combined errors of both the modulator and the demodulator. Since the demodulation error of the receiver 100 has been measured, and is therefore known, the demodulation error is subtracted symbol by symbol from the combined modulation error to extract the transmitter modulation error. Thus, the transmitter modulation error is measured for each symbol as a difference between the known symbol demodulation error for that symbol and the combined measured error for that symbol, in which the combined measured error is a difference between the recovered I and Q values represented by the output demodulated signal 220 and the symbol I and Q values in the test symbol sequence 200. The demodulation errors for the symbols in the test symbol sequence are used to compute the error vector magnitude (EVM).

Figure 3:
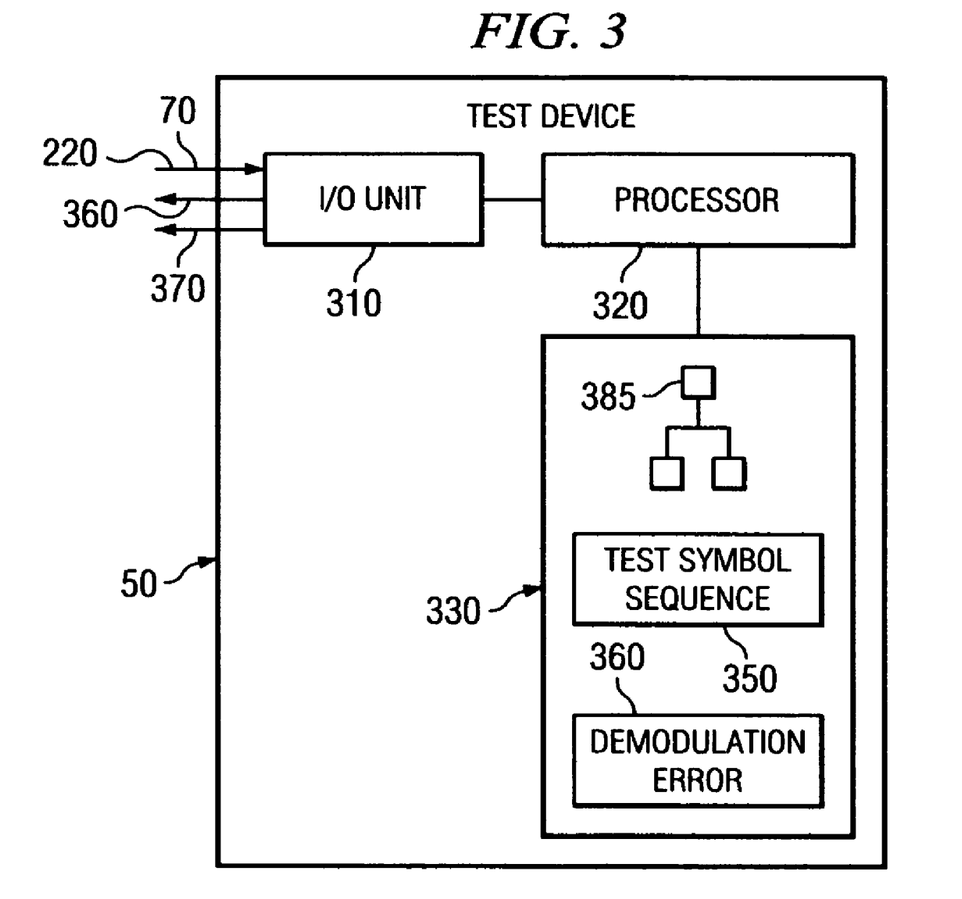
FIG. 3 is a block diagram illustrating an exemplary tester for testing multiple transceivers in parallel, in accordance with embodiments of the present invention.

FIG. 3 is a block diagram illustrating an exemplary embodiment of a tester 50 for testing multiple transceivers in parallel, in accordance with embodiments of the present invention. As mentioned above in connection with FIGS. 1 and 2, all or part of the tester 50 can be an external device connected to the output of the digital baseband processor 115 of one or more transceivers 40. Alternatively, all or a part of the tester 50 can constitute part of the digital baseband processor 115 to reduce the test equipment needed to test multiple transceivers in parallel. The tester 50 includes a I/O unit 310, a processor 320 and memory 330. The I/O unit 310 is coupled to receive the output demodulated signal labeled 70 from the receiver 100 (shown in FIGS. 1A and 2A) during receiver testing and the output demodulated signal labeled 220 from the receiver 100 (shown in FIGS. 1B and 2B) during transmitter testing.

The I/O unit 310 passes the output demodulated signal 70 to the processor 320 to measure the demodulation error of the receiver of the transceiver and passes the output demodulated signal 220 to the processor 320 to measure the modulation error of the transmitter of the transceiver. The processor 320 measures the demodulation error of the receiver by comparing the receiver test symbol sequence in the output demodulated signal 70 to an original test symbol sequence 350 stored in the memory 330. The original test symbol sequence 350 corresponds to the test symbol sequence used in the precision signal generator's 20 modulated test signal 60, shown in FIG. 1. The processor 320 stores the measured receiver demodulation error 360 in the memory 330 for subsequent use in measuring the modulation error 370 of the transmitter based on the additional output demodulated signal 220. For example, in one embodiment, the transmitter modulation error 370 is computed by subtracting the receiver demodulation error from the difference between the I and Q values of the original test symbol sequence 350 and the recovered test symbol sequence represented by the output demodulated signal 220. The demodulation error 360 and the modulation error 370 can be output to another device (e.g., a display) via I/O unit 310.

When implemented as part of the digital baseband processor 115 on the transceiver 40 (shown in FIGS. 2A and 2B), the processor 320 and digital baseband processor 115 can be implemented using a shared processing device or respective individual processing devices. The memory 330 stores software 385 (e.g., operating instructions) corresponding to at least part of the functions discussed herein.

The loop-back test configuration illustrated in FIGS. 1B and 2B is most easily applicable to a transceiver capable of transmitting and receiving simultaneously on the same frequency. However, the loop-back test configuration of the present invention is also applicable to other transceivers employing time division duplexing (TDD) and/or frequency division duplexing (FDD). To accommodate TDD and/or FDD transceivers, various test resources are provided externally, some of which could be provided on the DUT interface (e.g., probecard or loadboard).

Figure 4:
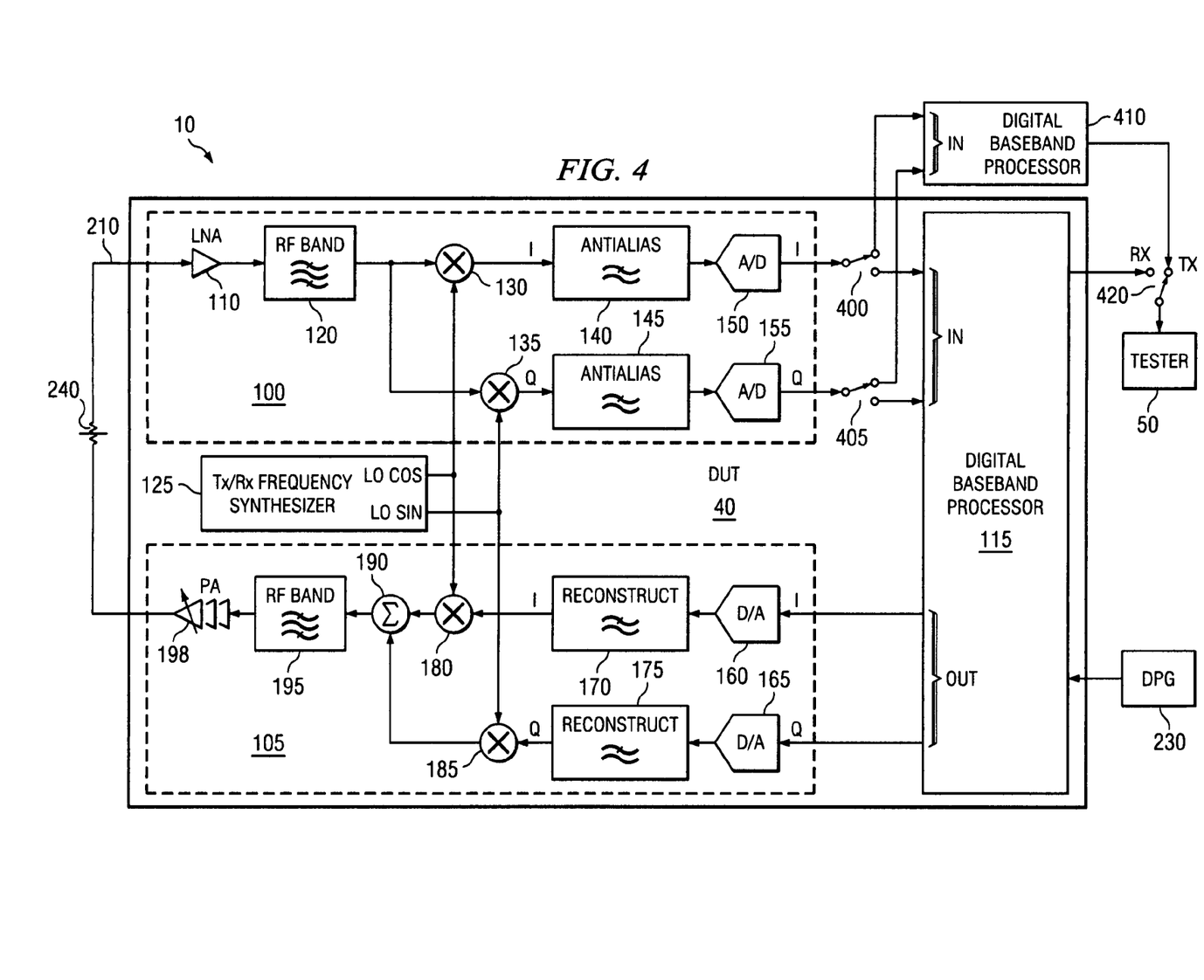
FIG. 4 is a block diagram illustrating another exemplary test system for testing multiple transceivers in parallel, in accordance with embodiments of the present invention.

FIG. 4 is a block diagram illustrating another exemplary test system for testing multiple transceivers in parallel, in accordance with embodiments of the present invention. Transceivers operating in time-division duplex (TDD) mode do not need to be designed to avoid the detrimental effects of signal coupling between the transmitter and the receiver. Thus, TDD transceivers are usually not capable of simultaneously transmitting and receiving. However, if the circuits in a TDD transceiver are designed to avoid or tolerate coupling between the transmitter and the receiver, such transceivers can be capable of simultaneous transmission and reception in a test mode, even though they do not operate with simultaneous transmission and reception in the TDD protocol. In a typical TDD radio transceiver architecture, cost is usually reduced by sharing components between the transmitter 105 and the receiver 100. For example, the frequency synthesizer 125 and digital baseband processor 115 are two common shared components. In order to implement the loop-back test configuration of the present invention in a TDD transceiver that is designed to avoid or tolerate coupling between the transmitter and the receiver, the shared components are duplicated externally in either the transmit or receive paths to override the TDD mode and permit loop-back testing.

In such a TDD transceiver, as shown in FIG. 4, the shared LO 125 is used simultaneously by the transmitter 105 and the receiver 100 during test. However, an external digital baseband processor 410 is provided to enable simultaneous transmission and reception processing during transmitter modulation testing. Switches 400 and 405 enable switching between the internal digital baseband processor 115 and the external digital baseband processor 410. For example, in receiver demodulation testing mode, switches 400 and 405 switch the I and Q digital signals to the internal digital baseband processor 115, while in transmitter modulation testing mode, switches 400 and 405 switch the I and Q digital signals to the external digital baseband processor 410.

Figure 5:
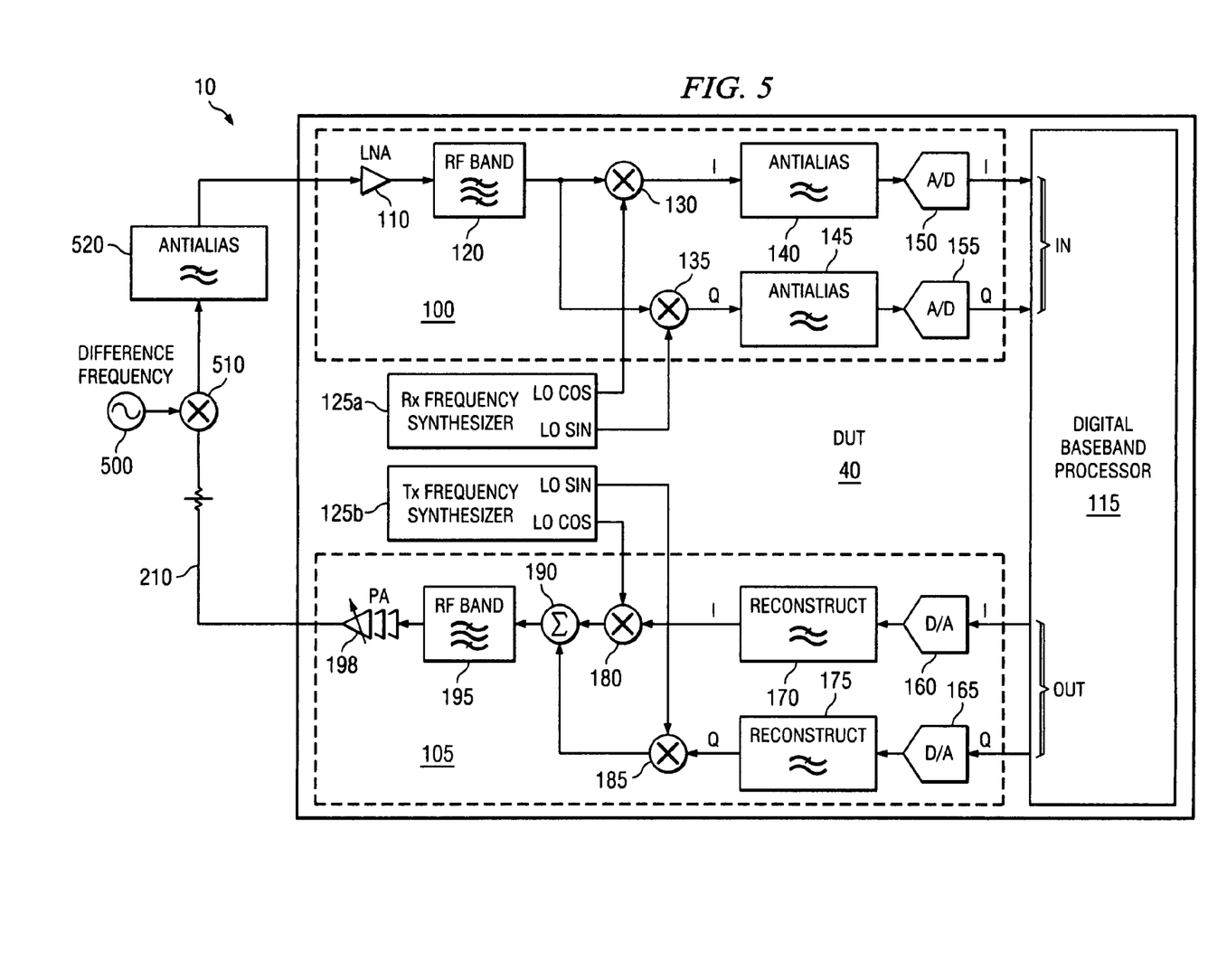
FIG. 5 is a block diagram illustrating another exemplary test system for testing multiple FDD transceivers in parallel, in accordance with embodiments of the present invention.

FIG. 5 is a block diagram illustrating another exemplary test system for testing multiple frequency-division duplexing (FDD) transceivers (only one of which is shown for simplicity) in parallel, in accordance with embodiments of the present invention. Mobile radio transceivers that communicate with a base station typically transmit and receive on different frequencies using FDD. As a result, during transceiver testing, the transmit frequency must be translated to the receive frequency for proper operation. As shown in FIG. 5, the frequency translation is provided by an external difference frequency oscillator 500, an external mixer 510 and an external anti-alias bandpass filter 520. The configuration of FIG. 5 maintains high parallelism by sharing the external difference frequency oscillator 500 among all transceiver DUTs 40. However, the configuration of FIG. 5 does require an external mixer 510 and anti-alias filter 520 for each transceiver DUT 40 tested simultaneously.

Figure 6:
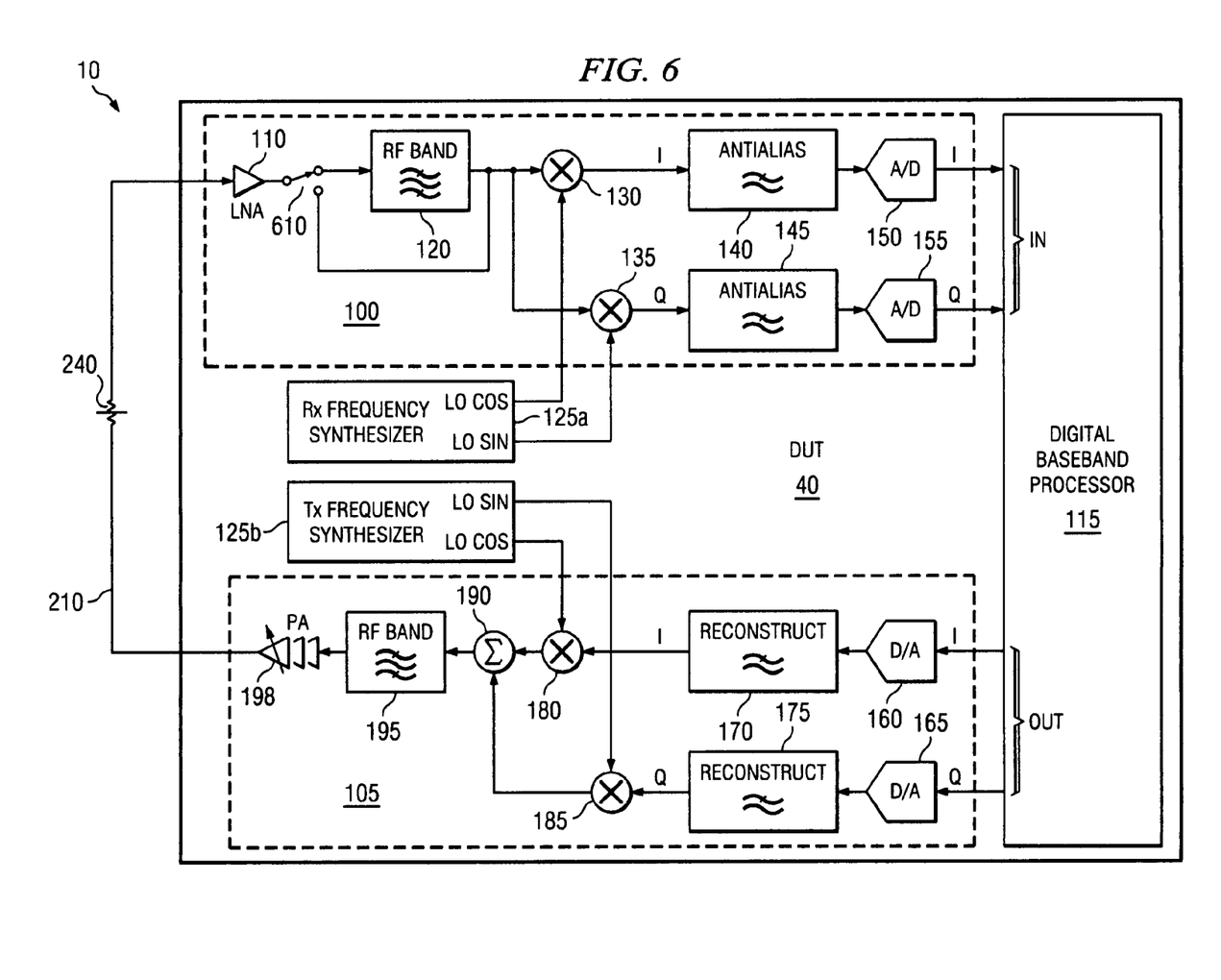
FIG. 6 is a block diagram illustrating another exemplary test system for testing multiple FDD transceivers in parallel, in accordance with embodiments of the present invention.

FIG. 6 is a block diagram illustrating another exemplary test system for testing multiple FDD transceivers (only one of which is shown for simplicity) in parallel, in accordance with embodiments of the present invention. In transceiver architectures in which the receiver and transmitter have separate local oscillators (LOs), as shown in FIG. 6, the LOs are designed so that their tuning ranges are capable of overlapping during testing. Designing the transmit and receive frequency synthesizers 125a and 125b, respectively, to overlap or causing the transmit and receive frequency synthesizer 125a and 125b to overlap during testing maintains the highest parallel use of external test resources at the cost of expanding the bandwidth of the receiver chain for test purposes. However, the RF bandpass filters 195 and 120 cannot be designed so that their pass bands overlap. Therefore, during test, one of the RF bandpass filters 195 or 120 is bypassed. In FIG. 6, the transceiver DUT 40 is designed to include a switch 610 in the receiver 100 that enables bypass of the RF bandpass filter 120 during testing.

Figure 7:
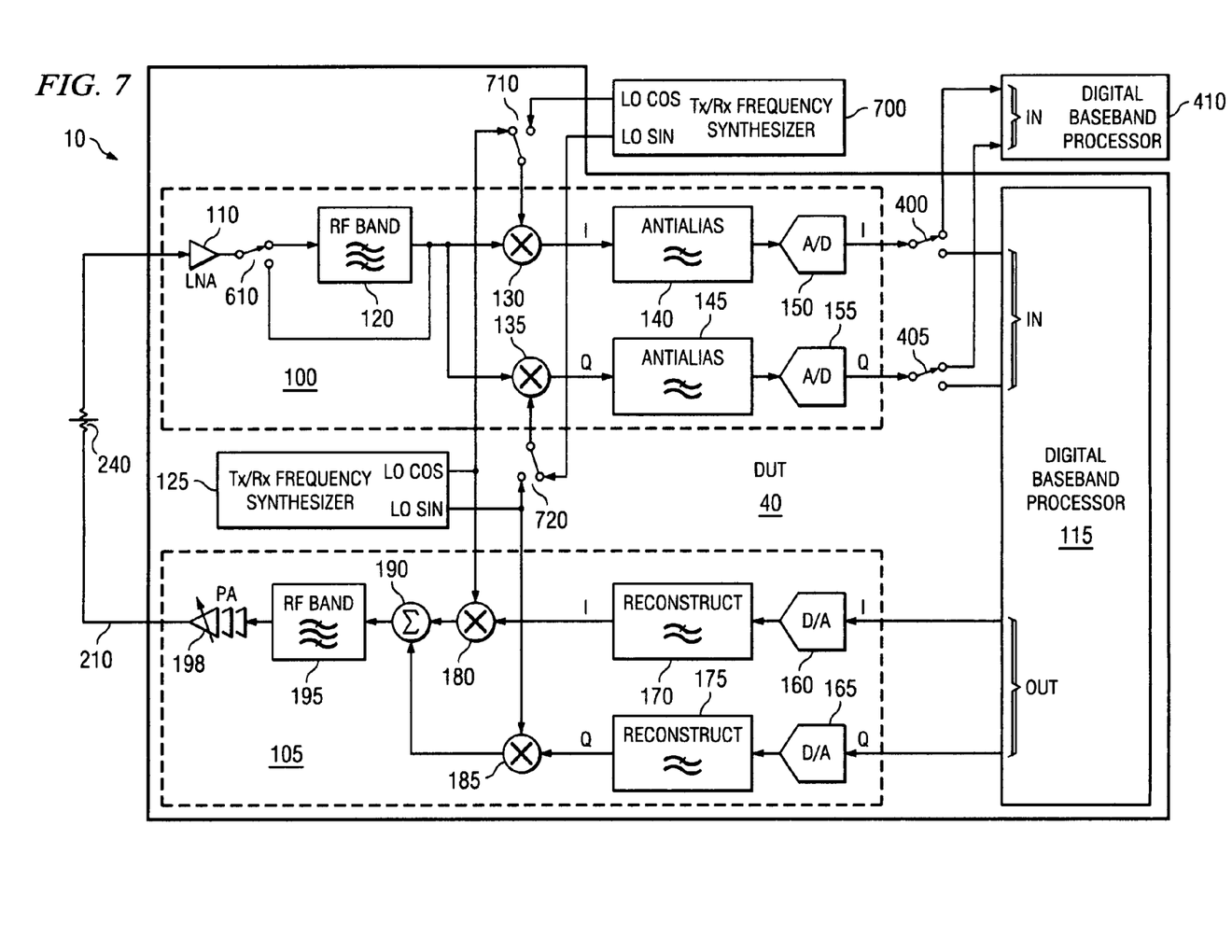
FIG. 7 is a block diagram illustrating another exemplary test system for testing multiple FDD/TDD transceivers in parallel, in accordance with embodiments of the present invention.

FIG. 7 is a block diagram illustrating another exemplary test system for testing multiple FDD/TDD transceivers (only one of which is shown for simplicity) in parallel, in accordance with embodiments of the present invention. In architectures where the LO frequency synthesizer 125 is shared, as in FDD with TDD transceivers, the transceiver DUT 40 can be designed to include connection between either the receive or transmit path and the output of an external LO frequency synthesizer 700. In FIG. 7, the transceiver DUT 40 is designed to include switches 710 and 720 that enable switching between the internal frequency synthesizer 125 and the external frequency synthesizer 700. For example, in receiver demodulation testing mode, switches 710 and 720 switch to the internal frequency synthesizer 125, while in transmitter modulation testing mode, switches 710 and 720 can switch to the external frequency synthesizer 700.

In addition, the transceiver DUT 40 shown in FIG. 7 is designed to include an external digital baseband processor 410 to enable simultaneous transmission and reception processing during transmitter modulation testing, as described above in connection with FIG. 4. Although the external synthesizer 700 can be shared among the transceiver DUTs 40, one external baseband processor 410 is required per transceiver DUT 40. Furthermore, as in FIG. 6, the transceiver DUT 40 is designed to include switch 610 that enables bypass of the RF bandpass filter 120 during testing.

Figure 8:
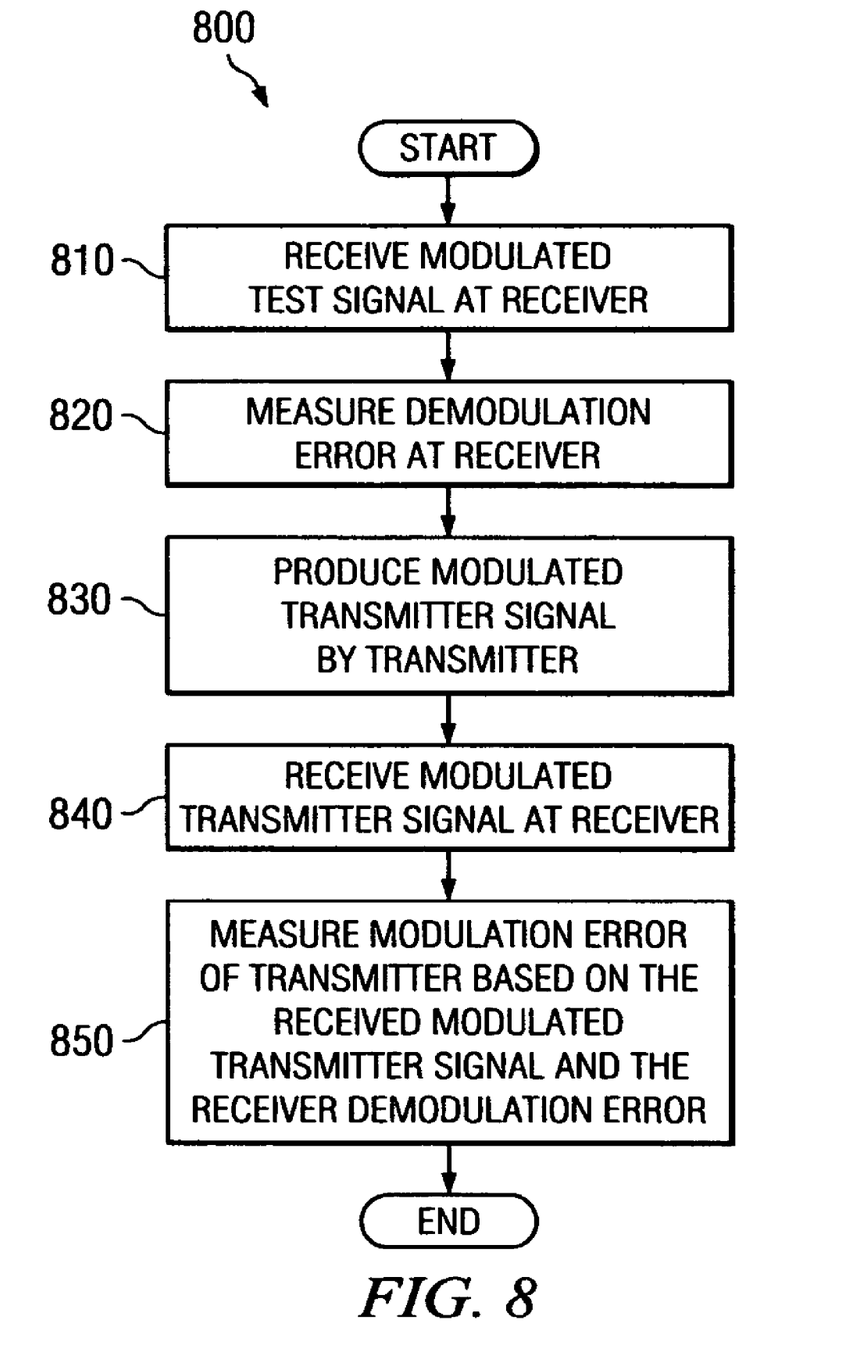
FIG. 8 is a flow chart illustrating an exemplary method for testing a transceiver, in accordance with embodiments of the present invention.

FIG. 8 is a flow chart illustrating an exemplary method 800 for testing a transceiver, in accordance with embodiments of the present invention. To measure the demodulation error of a receiver of an integrated transceiver, a modulated test signal is received at the receiver from a precise signal generator at step 810. The receiver demodulates the modulated test signal and outputs a demodulated signal to a tester for measuring the demodulation error of the receiver at step 820. For example, in one embodiment, the tester measures the demodulation error for each symbol as a difference between the symbol I and Q values in the output demodulated signal and the symbol I and Q values in the modulated test signal.

At step 830, the transmitter of the integrated transceiver produces an outbound modulated transmitter signal from an original test symbol signal, and inputs the outbound modulation signal to the receiver via a loop-back connection at step 840. The receiver demodulates the outbound modulated transmitter signal to produce an output demodulated signal, from which the modulation error of the transmitter is measured based on the known demodulation error of the receiver at step 850. For example, in one embodiment, the transmitter modulation error is computed by subtracting the demodulation error of the receiver from the difference between the original test symbol signal and the output demodulated signal produced in response to the outbound modulated transmitter signal. Using the loop-back test configuration, multiple transceivers can be tested in parallel using the same precision signal generator without requiring separate precision receivers for each transceiver.

As will be recognized by those skilled in the art, the innovative concepts described in the present application can be modified and varied over a wide rage of applications. Accordingly, the scope of patents subject matter should not be limited to any of the specific exemplary teachings discussed, but is instead defined by the following claims.

I claim:

1. A test system for testing a transceiver comprising a receiver and a transmitter, said test system comprising:
a signal generator operable to generate a first modulated signal; and
a tester operable to measure a first demodulation error produced by the receiver in response to said first modulated signal and to measure a modulation error of the transmitter based on said first demodulation error and a second demodulation error, said second demodulation error produced by the receiver in response to a second modulated signal generated by the transmitter and coupled from the transmitter to the receiver.

2. The system of claim 1, wherein said signal generator generates said first modulation signal and the transmitter generates said second modulation signal in response to a common symbol sequence.

3. The system of claim 1, wherein said tester is embodied at least in part within the transceiver.

4. The system of claim 1, wherein said tester is external to the transceiver.

5. The system of claim 1, additionally comprising a loop-back connection within the transceiver connecting the receiver with the transmitter.

6. The system of claim 1, additionally comprising an interface to said tester for connecting the transmitter with the receiver.

7. The system of claim 1, wherein said first modulated signal represents symbols, each defined by a respective in-phase (I) and quadrature-phase (Q) value, and wherein the receiver is operable to demodulate said first modulated signal to produce a first output demodulated signal including I and Q values respectively approximating said symbols represented by said first modulated signal.

8. The system of claim 7, wherein said first demodulation error is measured for each of said symbols, and wherein said first demodulation error for one of said symbols is a difference between said I and Q values in said first output demodulated signal for said one of said symbols and said I and Q values in said first modulated signal for said one of said symbols.

9. The system of claim 8, wherein the receiver is operable to demodulate said second modulated signal to produce a second output demodulated signal, and wherein said second modulated signal includes said I and Q values approximating said symbols in said first modulated signal.

10. The system of claim 9, wherein said modulation error is measured for each of said symbols, and wherein said modulation error for one of said symbols is a difference between said first demodulation error for said one of said symbols and a difference of said I and Q values in said first modulated signal that define said one of said symbols and said I and Q values in said second output demodulated signal for said one of said symbols.

11. A test system for parallel modulation error testing of transceivers, each including a receiver and a transmitter, said test system comprising:
a signal generator operable to generate a first modulated signal for substantially simultaneous input to the receivers of each of the transceivers; and
a tester operable to measure a respective first demodulation error produced by each of the receivers in response to said first modulated signal and to measure a respective modulation error for each of the transmitters based on said respective first demodulation error and a second respective demodulation error, said second respective demodulation error produced by each of the receivers in response to a respective second modulated signal generated by the respective transmitters and coupled from the respective transmitters to the respective receivers.

12. The system of claim 11, further comprising:
a digital pattern generator operable to produce a symbol sequence and provide said symbol sequence to the transmitters of the transceivers.

13. The system of claim 12, wherein said digital pattern generator is at least partially embodied within each of the transmitters.

14. The system of claim 12, wherein said digital pattern generator is external to the transceivers and inputs said symbol sequence to the transmitters of the transceivers in parallel.

15. The system of claim 11, wherein said first modulated signal represents symbols, each defined by a respective in-phase (I) and quadrature-phase (Q) value, and wherein each of the receivers is operable to demodulate said first modulated signal to produce a respective first output demodulated signal including I and Q values respectively approximating said symbols represented by said first modulated signal.

16. The system of claim 15, wherein said first demodulation error for each of the receivers is measured for each of said symbols, and wherein said first demodulation error of one of the receivers for one of said symbols is a difference between said I and Q values in said first output demodulated signal for said one of said symbols and said I and Q values in said first modulated signal for said one of said symbols.

17. The system of claim 16, wherein each of the receivers is operable to demodulate said respective second modulated signal to produce a respective second output demodulated signal including I and Q values respectively approximating said symbols in said first modulated signal.

18. The system of claim 17, wherein said modulation error for one of the transmitters associated with said one of the receivers is measured for each of said symbols, and wherein said modulation error of said one of the transmitters for said one of said symbols is a difference between said first demodulation error of said one of the receivers for said one of said symbols and a difference of said I and Q values in said first modulated signal that define said one of said symbols and said I and Q values in said second output demodulated signal for said one of said symbols.

19. The system of claim 11, wherein the transceivers operate using at least one of time division duplexing or frequency division duplexing.

20. A method for testing a transceiver including a receiver and a transmitter, said method comprising:
receiving a first modulated signal at the receiver;
measuring a first demodulation error for the receiver based on said first modulated signal;
producing a second modulated signal by the transmitter;
receiving said second modulated signal at the receiver; and
measuring a modulation error for the transmitter based on said first demodulation error and a second demodulation error produced by the receiver in response to said second modulated signal.

21. The method of claim 20, wherein said measuring said first demodulation error includes demodulating said first modulated signal at the receiver to produce a first output demodulated signal approximating symbols represented by said first modulated signal, each of said symbols being defined by a respective in-phase (I) and quadrature-phase (Q) value.

22. The method of claim 21, wherein said measuring said first demodulation error includes measuring said first demodulation error for each one of said symbols as a difference between said I and Q values representing said one of said symbols in said first output demodulated signal and said I and Q values representing said one of said symbols in said first modulated signal.

23. The method of claim 22, wherein said measuring said modulation error includes demodulating said second modulated signal at the receiver to produce a second output demodulated signal including I and Q values respectively approximating said symbols in said first modulated signal.

24. The method of claim 23, wherein said measuring said modulation error further includes measuring said modulation error for each one of said symbols a difference between said first demodulation error for said one of said symbols and a difference of said I and Q values in said first modulated signal that define said one of said symbols and said I and Q values in said second output demodulated signal for said one of said symbols.

* * * * *